(12) United States Patent
Meirosu et al.

(10) Patent No.: US 9,077,633 B2
(45) Date of Patent: Jul. 7, 2015

(54) METHOD AND AN APPARATUS FOR EVALUATING NETWORK PERFORMANCE

(75) Inventors: Catalin Meirosu, Stockholm (SE); Svante Ekelin, Vallentuna (SE); Andreas Johnsson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 238 days.

(21) Appl. No.: 13/807,126

(22) PCT Filed: Jun. 29, 2010

(86) PCT No.: PCT/SE2010/050748
§ 371 (c)(1), (2), (4) Date: Dec. 27, 2012

(87) PCT Pub. No.: WO2012/002853
PCT Pub. Date: Jan. 5, 2012

(65) Prior Publication Data
US 2013/0100847 A1    Apr. 25, 2013

(51) Int. Cl.
*H04L 12/26* (2006.01)

(52) U.S. Cl.
CPC ............ *H04L 43/10* (2013.01); *H04L 12/2602* (2013.01); *H04L 43/00* (2013.01); *H04L 43/0829* (2013.01); *H04L 43/0852* (2013.01); *H04L 43/0864* (2013.01); *H04L 43/0876* (2013.01)

(58) Field of Classification Search
USPC ........................................................ 370/352
See application file for complete search history.

(56) References Cited

U.S. PATENT DOCUMENTS

| 2002/0174207 A1* | 11/2002 | Battou .......................... 709/223 |
| 2006/0203773 A1* | 9/2006 | Georges et al. ............... 370/329 |
| 2008/0175172 A1 | 7/2008 | Nishi |

OTHER PUBLICATIONS

Prieto & Stadler,: A-GAP:"An Adaptive Protocol for Continuous Network Monitoring with Accuracy Objectives." IEEE Transactions on Network Service Management, vol. 4, No. 1, pp. 2-12, 2007; TRITA-EE_2006_034.
Photo & Stadier, R : "Monitoring Flow Aggregates with Controllable Accuracy." Lecture Notes in Computer Science, vol. 4787, pp. 6475, 2007 TRITA-EE_2007_030.

* cited by examiner

*Primary Examiner* — Dang Ton
*Assistant Examiner* — Mewale Ambaye

(57) ABSTRACT

The present invention relates to methods and node entities for enabling active measurement for evaluating network performance in a network comprising a logical tree structure 10 representing at least one service. Said service is provided through a set of links from an initial node in an upper level of the tree structure to a node in a lower level of said tree structure. Each node of the tree structure is configured to perform active measurement of link characteristics. One object of the present invention is to provide a method for minimizing the data overhead introduced in a data network during measuring of estimates of the data network performance. By aggregating measurement results of estimated and measured link characteristics in the nodes of said tree structure and propagating the aggregated results and store the aggregated results in the nodes.

10 Claims, 4 Drawing Sheets

METHOD AND AN APPARATUS FOR EVALUATING NETWORK PERFORMANCE

TECHNICAL FIELD

The present invention relates to network measurement management, in particular to a method and an apparatus in terms of a node entity for enabling active measurement for evaluating network performance in data communications networks.

BACKGROUND

A data communications network may be considered to comprise a mass of network nodes interconnected by data paths.

In packet switched data networks monitoring a data path, or in other words, estimating a condition such as available bandwidth (aka available capacity) end-to-end over a data path of the network is useful in several contexts; including Service Level Agreement (SLA) verification, network monitoring and server selection.

Mainly, there are two ways to estimate link and/or path characteristic(-s) such as available bandwidth, namely passive or active monitoring.

A number of passive methods are known, e.g. in NetFlow and Sflow, each network node samples the packets passing through and then forwards, potentially only a subset of these samples, to a management workstation running a NetFlow or Sflow collector that aggregates the results to present a network-wide view.

Other known measuring methods are known from the documents Prieto, A. G., Stadler, R.: A-GAP: "An Adaptive Protocol for Continuous Network Monitoring with Accuracy Objectives." IEEE Transactions on Network Service Management, Vol. 4, No. 1, pp. 2-12, 2007; and Prieto, A. G., Stadler, R.: "Monitoring Flow Aggregates with Controllable Accuracy." Lecture Notes in Computer Science, Vol. 4787, pp. 64-75, 2007.

In the above documents, Stadler et al. proposes a series of algorithms that allow network nodes to exchange device and port-related MIB (Management Information Base) counter values in an efficient manner while calculating a network-wide aggregate value, such as e.g. the top 5 flows in the network. The network nodes, in Stadler et al., are organized in a tree topology overlay, executed on top of the physical links. The root node launches a request for a particular type of network-wide aggregate, and then at each level along the tree the nodes perform required calculation and send the aggregated results from the leafs towards the root node.

The solution proposed by Stadler et al. relies on values that are already known to the network nodes and it is therefore not suitable for performing active measurements. Further, it does not take into account active measurement methods. Further, passive monitoring cannot measure e.g. latency or round-trip time. And centralized collection of performance counters obtained through passive monitoring at the distributed nodes does not scale well in large, dynamic networks.

Passive measurements need to be complemented by active measurements in order to evaluate the latency, round-trip time and packet loss between nodes. Measuring such values hop-by-hop between nodes that are placed further than the network edge require adding dedicated measurement workstations or support for technology-specific protocols such as Label Switched Path (LSP)-ping.

In contrast to passive measurements one can monitor the network utilizing active monitoring or active measurement techniques. Active measurements have been used for evaluating network performance for a long time. Recent advancements include how to measure parameters such as path available capacity. A method for measuring path available capacity utilizing two measurement nodes located on each end of a path is known. The first node injects traffic into the network while the second node evaluates the effects of the network traffic on the packets it receives. The estimation of parameters such as round-trip time, latency or packet loss also requires active measurement methods.

Measuring available end-to-end bandwidth is typically done by active probing of the data path. The available bandwidth can be estimated by transmitting probe traffic, such as User Data Protocol (UDP) probe packets including a train of probe packets into the data path, and then analyzing the observed effects of other data packet communications, here denoted, cross traffic on the probe packets. Typically, large UDP probe packets having a specified inter-packet separation are transmitted. This kind of active measurement requires access to both sender and receiver hosts, referred to as sender and receiver nodes, but does not require access to any intermediate node(s) in the path between the sender and receiver nodes. Conventional approaches to active probing require the transmission of probe packet traffic into the data path of interest at a rate that is sufficient transiently to use all available bandwidth and cause congestion. The desired measure of the available bandwidth is determined based on the increase in delay due to the probe packets having experienced congestion between sender and receiver node. The probe packet rate where the data path delay begins increasing corresponds to the point of congestion, and thus is indicative of the available bandwidth.

Active measurement techniques such as BART (Bandwidth Available in Real Time) are good at providing an end-to-end view of the network, but it cannot help to pinpoint the actual location of a performance problem without installing additional measurement infrastructure into the network.

One problem with the known active measurement methods for estimating network performance is that said methods introduce a lot of data overhead which may have a bad influence on the network performance.

SUMMARY

One object of the exemplary embodiments of the present invention is to provide a method for minimizing the data overhead introduced in a data network during measuring of estimates of the data network performance.

Said object is achieved by utilizing a logical tree structure of a service in the network, by aggregating measurement result of estimated and measured link characteristics in the nodes of said tree structure, propagating the aggregated results through the network and store the aggregated results in the nodes. The propagation of the aggregated results and the distributed storing of aggregated measurement contribute to the reduction of measurements in the network.

The exemplary embodiments of the present invention provide a method for enabling active measurement for evaluating network performance in a network comprising a logical tree structure representing at least one service. Said services are provided through a set of links from an initial node in an upper level of the tree structure to a node in a lower level of the tree structure. Each node of the tree structure comprises a measurement process configured to perform active measurement of link characteristics. According to embodiments of the present invention, each node is configured to receive a request message requiring measurement results of link characteristics related to a service. Further, each node is adapted to forward the received request message to at least one node of the next lower level related to the service, if any such lower level exists relatively to the node. According to embodiments, the measurements between two nodes are generated on request/demand, e.g. triggered by the reception of a request message. According to other embodiments, the active measurement is continuously performed. Further, the node receives an aggregation message comprising requested aggregated measurement results of the link characteristics from one or more nodes in the next lower level of the tree structure, if any such lower level exists relatively to the node, and it establishes an aggregation message by aggregating own measurement result of the link characteristic achieved by the performed measurement process and received requested aggregated measurement results of the link characteristics. The node will then send the established aggregation message to the node in the next upper level, or as specified in the request message, and store a copy of the sent aggregated measurement results in a database.

The exemplary embodiments of the present invention also provide a node entity for enabling active measurement for evaluating network performance in a network comprising a logical tree structure representing at least one service. The service is provided through a set of links from an initial node in an upper level of the tree structure to one node or a set of nodes in a lower level of said tree structure. The node entity comprises a module configured to perform active measurement of link characteristics. The entity further comprises a module configured to handle request messages at the reception of a request message requiring measurement results of a link characteristics related to a service, and to forward the received request message to a node of the next lower level related to the service, if a lower level relatively the node exists. A module is provided, which is configured to receive aggregated measurement results of said link characteristics from one or more nodes belonging to the next lower level of the tree structure, if any such lower level exists relatively to the node. The node entity comprises a module configured to establish an aggregation message by aggregating own measurement result of said link characteristics achieved by the performed measurement process and received aggregated measurement results of said link characteristics. The node entity is further provided with a module that is configured to send the established aggregation message to the node in the next upper level, or as specified in the received request message, and a database wherein a copy of the sent aggregated measurement results is stored.

Compared to performing end-to-end measurements the embodiments of the present invention provide a number of advantages.

One advantage is that the present invention reduces the overhead in terms of measurement traffic in a digital communication network. Said advantage is achieved by using tree-based aggregation and by storing aggregated measurement results in the nodes of the tree structure, even in the intermediate nodes.

Another advantage is that the link capacity of each link of a service is measured. Thus, the invention allows identification of links and networks segments that are causing problem in the data traffic transfer. When using end-to-end measurement, such identification of troublesome links are not possible.

Yet another advantage is that tree-based aggregation is highly scalable, i.e. the embodiments of the present invention can be implemented in networks of different size, both in small network systems as well as in large network systems.

A further advantage is that embodiments of the present invention provide methods and node entities for controlling the measurements dynamically and do not rely solely on device-specific values.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, the exemplary embodiments of the present invention may be practiced in other embodiments that depart from these specific details. In other instances, detailed descriptions of well known methods, devices, and circuits are omitted so as not to obscure the description of the present invention with unnecessary detail.

Figure 1:
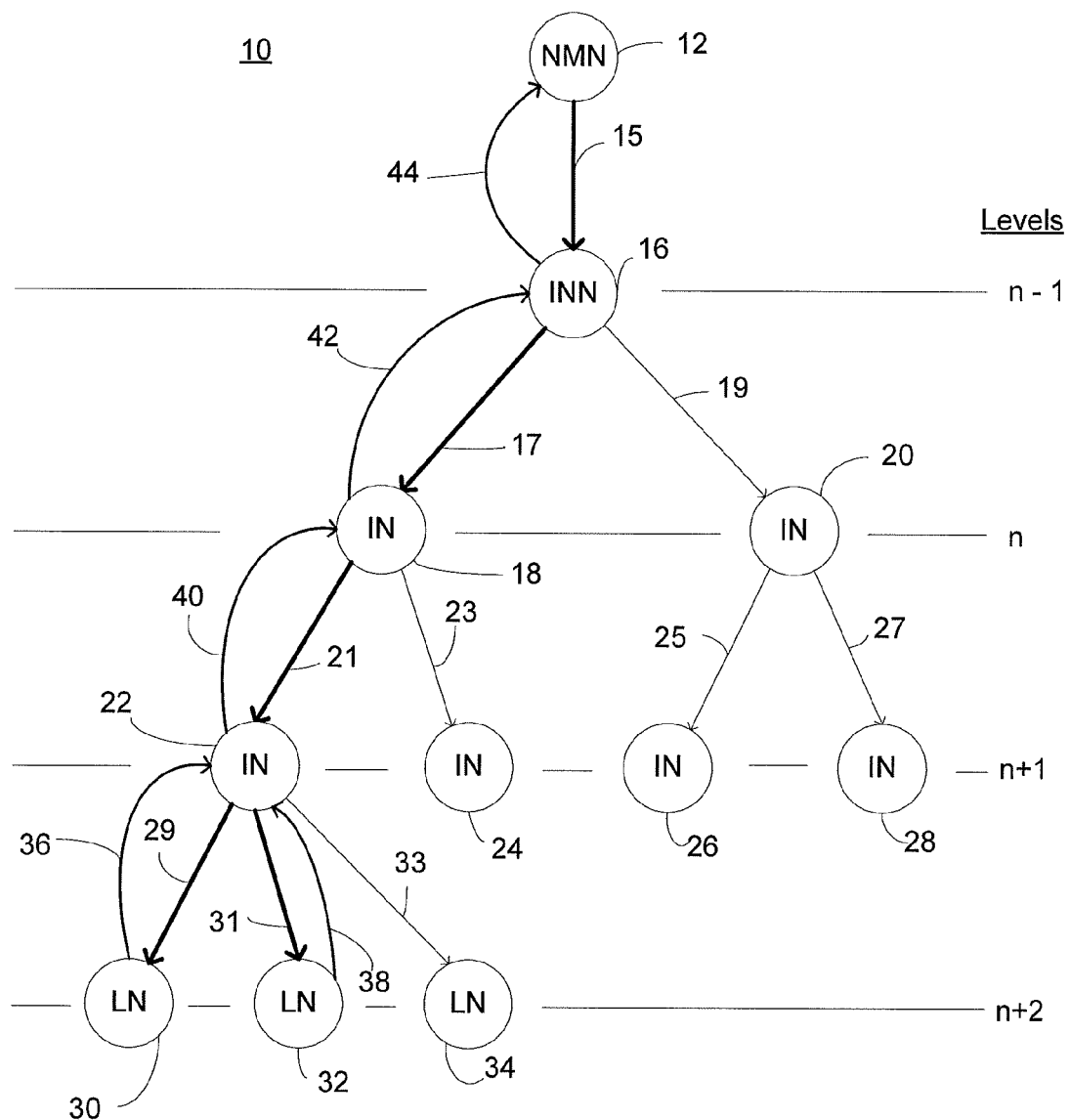
FIG. 1 is a block diagram of an exemplary network and logical tree structure in which the exemplary embodiments of the present invention described herein may be implemented.

FIG. 1 is illustrating an example of a tree structure 10 in a network in which the exemplary embodiments of the present invention are implemented.

For a data communications network, e.g. a mesh network, a set of logical tree structures can be created to represent either point-to-point or point-to-multipoint services (e.g. Ethernet services). Services may be organized according to a tree structure 10 as exemplified in FIG. 1. Each node of the tree corresponds to a physical node, e.g. a router or a switch, in the network while the arrows correspond to links interconnecting the nodes.

A service is provided through a path of nodes and links. A link is carrying the data traffic between two nodes of the network. A service is provided through a path starting from an initial node in an upper level of the tree structure 10 to one or more last nodes in a lower level of said tree structure. A number of intermediate nodes connect the first and the last node of the service.

In more detail, a Network Management Node, NMN, 12 is illustrated in FIG. 1. Said node is situated outside the network, e.g. at an operators premises. The network management node is not a node actively participating in the routing and/or switching of the data traffic through the network. It is therefore not considered as a part of a tree structure 10.

Regarding the notation of the levels in FIG. 1, an arbitrary level is denoted n. From said level n, the next upper level is denoted n−1 and the next lower level is denoted n+1.

A service is introduced from the NMN 12 via a link/connection 15 into a root node 16, even denoted Initial Node INN, in the highest level of the tree structure, here denoted n−1. In this example, the initial node INN is linked to two Intermediate Nodes IN, 18 and 20, of the closest lower level, here denoted n. Node 16 is linked to node 18 through link 17 and to node 20 via link 19. Node 18 in level n is linked to the intermediate nodes 22 and 24 of the next lower level, n+1. Node 18 is linked to node 22 through the link 21 and to node 24 via link 23. Node 22 in level n+1 is linked to the leaf nodes 30, 32 and 34 of the next lower level, n+2. Node 22 is linked to node 30 through the link 29, to node 32 through link 31 and to node 34 via link 33. Node 20 in level n is linked to the nodes 26 and 28 in level n+1. Node 20 is linked to node 26 through the link 25 and to node 28 via link 27. Each of the nodes 24, 26, 28, 30, 32 and 34 is the last node of the paths which starts at the initial node, or root node 16. Said last nodes may therefore be denoted as leaf nodes of the tree structure of the network.

When describing the relation and communication between two nodes in a tree structure of a network, it is possible to use the well-known parent and child node terminology. A node in one level is denoted as parent node to a node in the next lower level. A parent node may have one or more child nodes. In the example, FIG. 1, node 22 is the parent node to nodes 30, 32, and 34, which are the child nodes of node 22. Node 18 is the parent node to its child nodes 22 and 24.

Observe that if the service is a point-to-point service the tree will be reduced to a sequence of nodes. Multiple trees could co-exist for performing multiple computations of path aggregate values simultaneously. A service is dedicated to a path from the initial node to a leaf node.

In FIG. 1, one path belonging to one service is highlighted by bold arrows. This service is initiated by the network management node NMN 12 into the initial node 16 in the highest level, upper level n−1. The path of the service is uni-directional and starts in node 16, passes link 17 to child node 18 in level n. Node 18 routes/switches the service to node 22 in the next lower level n+1 via link 21. Parent node 22 in level n+1 routes/switches to two of its child nodes 30 and 32 in the next lower level n+2. Said nodes have no child nodes in a next lower level. Therefore, the nodes 30 and 32 are leaf nodes, i.e. last nodes, of the service and path. The exemplified service is a point-to-multi-point service.

The embodiments of the present invention provides a method for enabling active measurement for evaluating network performance in a network comprising a logical tree structure representing at least one service. The method according to the invention comprises a measurement process configured to perform active measurement of link characteristics. A number of well-known measurement methods or processes, e.g. BART, Iperf, PathChirp, may be used. As described in the background section, one way of measuring the performance of a path or service is to perform active end-to-end measurements without active participation from the intermediate nodes. According to the present invention, another approach is used. The intermediate nodes are active in the measurement process to measure one or more link characteristics. The link capacities are stored as measurement results, which are the result of the measurement process which may involve the measurement of certain link characteristics as well as the calculation of the link characteristics by means of a calculation process and/or mathematical algorithm, e.g. statistical formula, wherein one or more values are input data. The measurement results from nodes of a service are sent back to the initial node and aggregated and stored in each node on the way back to the initial node. This approach results in a distributed storage of measurement results and will contribute to a decreased overhead due to the measurement process and transfer of measurement results. By using a tree-based aggregation of measurement results, the invention reduces the overhead in terms of measurement traffic compared to utilizing end-to-end measurement methods. For example, if an operator of a network is interested in measurement results between nodes 16 and 30 as well as between 16 and 32 in FIG. 1, the paths between the nodes 16 and 30, and 16 and 32, only have to be measured once. This is in contrast to the end-to-end case wherein the whole path between 16 and 30 and the whole path between 16 and 32 are measured one time each, i.e. two measurement processes have to be performed.

According to the embodiments of the present invention, a request for measurement results enters the network through the root of the tree. In FIG. 1 this root is the initial node 16. The request may be a request message generated by the network management node NMN 12. The initial node INN 16 performs an active measurement between itself and its child node IN 18. The request is then propagated to node 18 which in turn measures the link characteristics of link 21 and the child node 22, and so forth. Measurement results are then aggregated on each level in the tree and then sent upwards as a message, e.g. in an aggregation message, according to the curved arrows 36, 40, 42, and 44.

Figure 2:
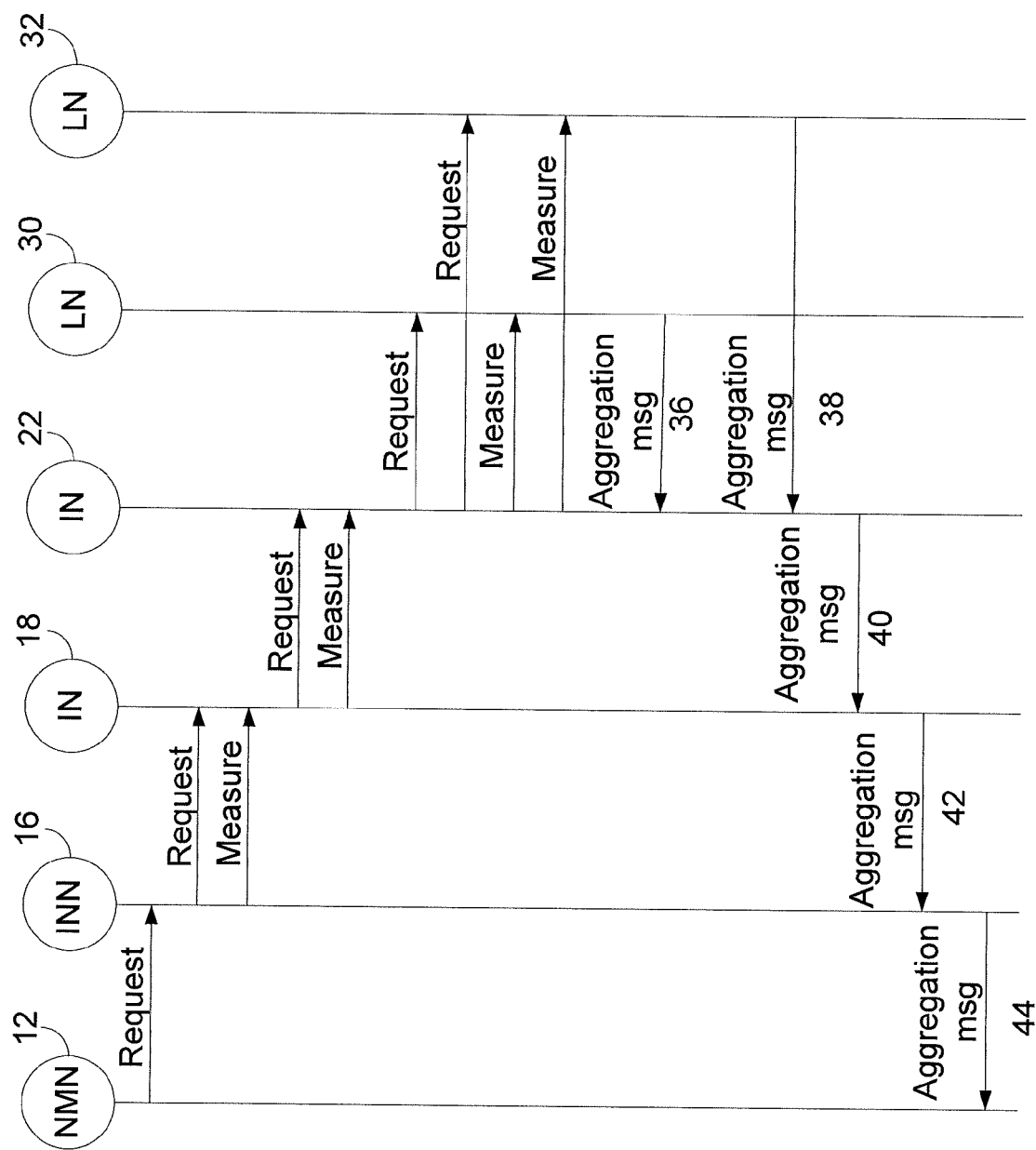
FIG. 2 is a sequence scheme illustrating the propagation of messages between nodes in a tree structure exemplified in FIG. 1, according to exemplary embodiments of the present invention.

FIG. 2 is a sequence scheme illustrating the propagation of messages according to the exemplary embodiments of the present invention, between nodes in a tree structure exemplified in FIG. 1. The nodes corresponding to the service are 16, 18, 22, 30 and 32 also shown in FIG. 1.

According to an exemplary embodiment of the present invention, a method involves the following steps:
1. A network management node, NMN, 12 requests measurements regarding a point-to-point, or alternatively point-to-multipoint, service S via an initial node 16 by sending a request message via connection/link 15 (shown in FIG. 1).
2. The initial node, INN, 16 performs a measurement process, e.g. by generating estimates, between itself and the child node 18 that are part of the service S. The request message is forwarded to the child node 18.
   a. The measurement process and forwarding of request are repeated for each level, from intermediate node IN to intermediate node IN, in the point-to-point or alternatively point-to-multipoint structure.
3. When reaching a leaf node, LN, e.g. one of nodes 30 and 32, the leaf node aggregates the measurement results, establishes a message, e.g. an aggregation message, and sends this back, illustrated by arrows 36 or 38, to its parent node 22 that is part of the service. Alternatively, if measurements from one parent node to a child node in the next level fail, the parent node is configured to establish an aggregation message comprising existing results and sends this back to its parent node that is part of the service.
4. Each intermediate node 22 and 18 being a parent node aggregates its own measurement results and measurement results received in an aggregate message from its child nodes, establishes an aggregation message and forwards the aggregated results to its parent node, as illustrated by arrows 40 and 42.
5. When an aggregation message reaches the initial node 16, this node aggregates the results and informs the requesting node 12 about the result as illustrated with arrow 44. As all nodes of a service are providing their own measurement results by aggregating said results to the received measurement results in an aggregation message.

Note that a service may either correspond to e.g. an Ethernet service running on top of a MPLS transport network, but it could also correspond to an aggregation of some or all services utilizing a set of links.

The method of aggregation at each level in the tree can vary depending on the performance parameter of interest, e.g. packet loss, packet delay, available link capacity.

According to the present invention, each node of a data communication network is configured to perform a number of operations.

Figure 3:
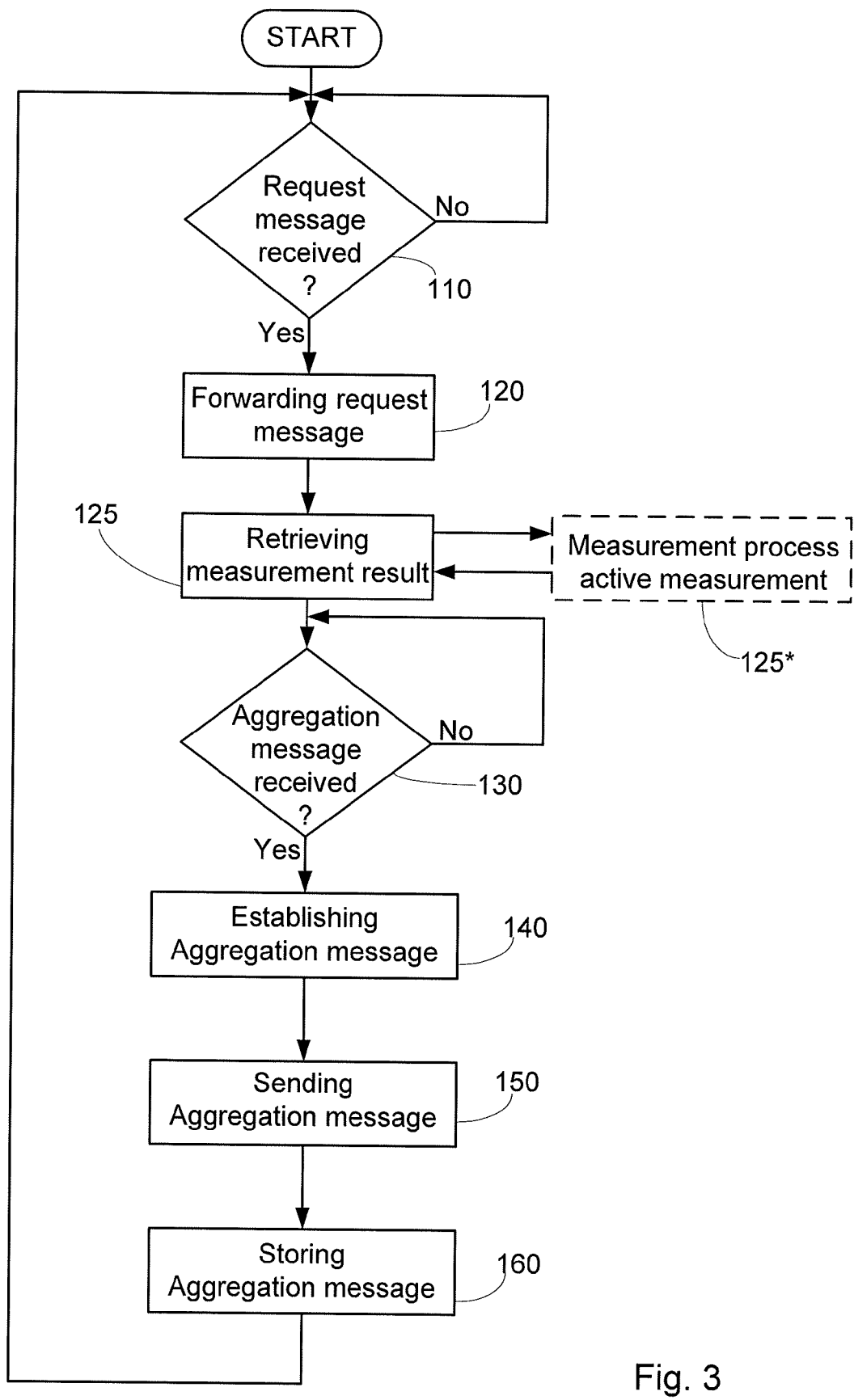
FIG. 3 is a flowchart illustrating embodiments of the method according to exemplary embodiments of the present invention.

FIG. 3 is a flowchart illustrating embodiments of the method according to the present invention. Said embodiments enable active measurement for evaluating network performance in a network comprising a logical tree structure representing at least one service. Said service is provided through a set of links from an initial node in an upper level of the tree structure to a node in a lower level of said tree structure. Each node is configured to perform measurement processes by utilizing active measurement to determine link characteristics. Each node is therefore configured to perform the following:

Block 110: Receiving a request message requiring measurement results of link characteristics related to a service. The node is configured to wait for a request message. When a request message is received, the service measurement information in the message is read. The information will contain sufficient information regarding measurement process to be used, e.g. what link characteristics to be retrieved from the measurement process, unidirectional or bidirectional measurement, the service or services is/are of interest, which node or nodes the received message to forward said message, which node/operator is the requesting node/operator, etc.

Block 120: Forwarding the received request message to at least one node of the next lower level related to the service, if any such lower level exists relatively to the node. When a request message has arrived to a leaf node, the leaf node is prohibited to forward the message.

Block 125: Retrieving measurement result from the active measurement process. Regarding the measurement process in block 125* and the measurements between two nodes, said measurements may either be generated on request/demand, or continuously performed for service(s). On demand, an active measurement is triggered between two nodes when the forward request is received. The alternative method is to continuously measure each link according to some known scheme, e.g. a self-organizing measurement scheme. Hence, when a generated request arrives to the node, the measurement results are already available in the node. The continuous measurements method mentioned above could be complemented by an implementation of threshold-triggered propagation of results along the branches of the tree. For example, the measurement results for a performance parameter, e.g. jitter, are only propagated if the performance parameter exceeds some pre-set threshold value. This reduces the amount of traffic of measurement results needed to be propagated.

Block 130: Receiving an aggregation message. Each node, except leaf nodes, will wait for an aggregation message. The aggregation message comprises requested aggregated measurement results of the link characteristics from one or more nodes in the next lower level of the tree structure, if any such lower level exists relatively to the node. The reception of an aggregation message triggers the establishment of a new aggregation message, block 140.

Block 140: Establishing an aggregation message by aggregating own measurement result of the link characteristics achieved by the performed measurement process and received requested aggregated measurement results of the link characteristics. In an initial node or an intermediate node, the reception of an aggregation triggers the establishment of a new aggregation message. In such a node, measurement failure may also trigger such an establishment of an aggregation message. If the node is a leaf node, the reception of a request message will trigger the establishing of an aggregation message. Alternatively, the establishment of an aggregation message may be threshold triggered. An implementation of threshold-triggered propagation of results along the branches of the tree may be used together with a continuous measurements method. For example, the measurement results for a link characteristic parameter, e.g. jitter, are only propagated if the performance parameter exceeds some pre-set threshold value. Thus, if a measured link characteristics parameter exceeds, becomes equal or lower than a pre-set threshold value, then an aggregation message comprising own measurement result of the link characteristics achieved by the performed measurement process and received aggregated measurement results, if any received, of the link characteristics is established.

Block 150: Sending the established aggregation message to the node in the next upper level, or as specified in the request message. In an intermediate node or a leaf node, the message is sent to its parent node. An initial node is configured to send the aggregation message to the network management node specified in the request message.

Block 160: Storing a copy of the sent aggregated measurement results in a database in the node or in a database connected to the node.

After the sending of the established aggregation message and the aggregated measurement result has been performed, the method will return to the "waiting-for-a-request-message" state, block 110.

The present invention also provides different exemplary embodiments of node entity for enabling active measurement for evaluating network performance in a network comprising a logical tree structure.

Figure 4:
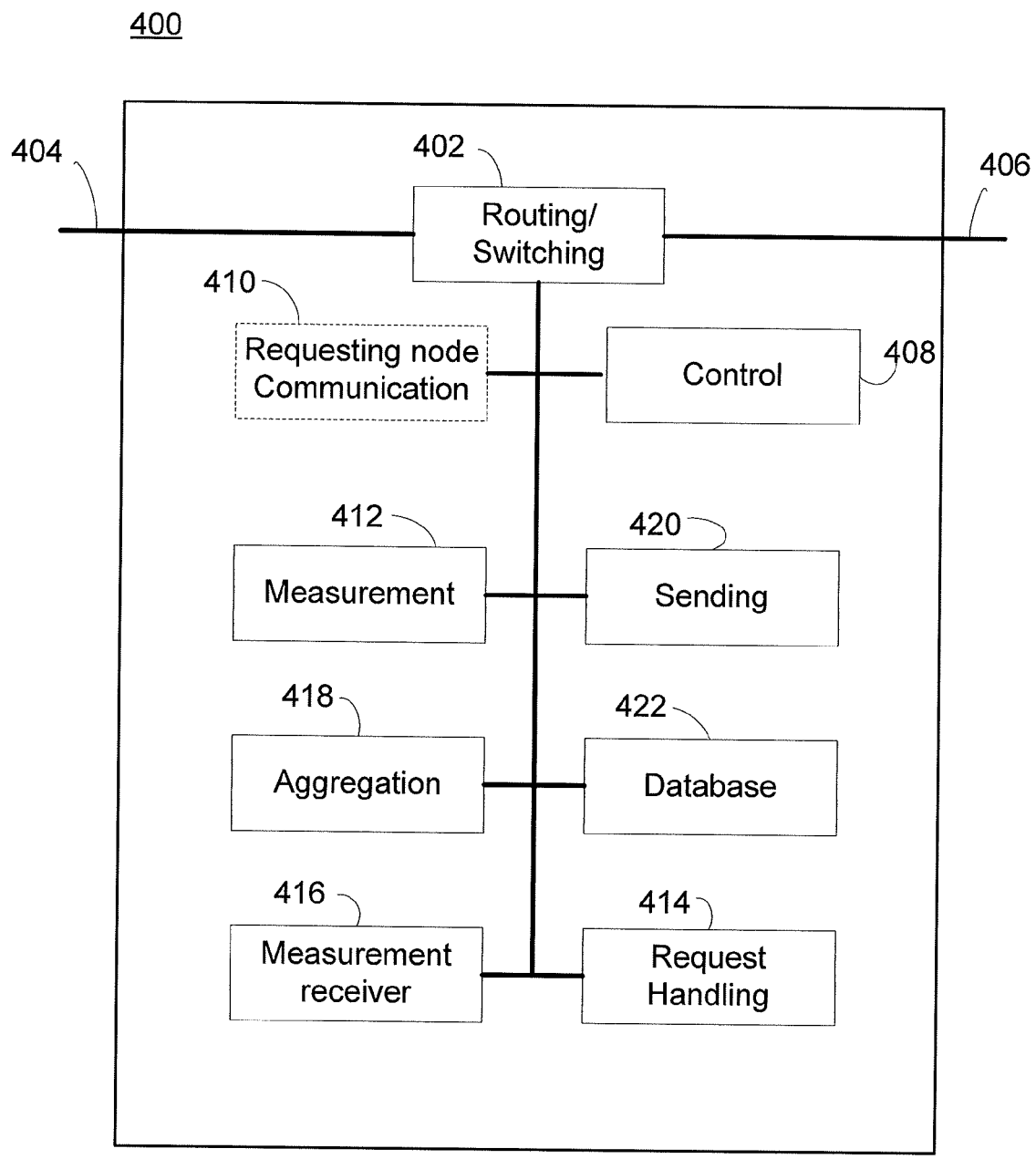
FIG. 4 is a block diagram illustrating exemplary embodiments of a node entity according to the present invention.

FIG. 4 is illustrating exemplary embodiments of a node entity 400 according to the present invention. The node entity 400 is situated in a physical node of a digital data communications network. The node entity 400 may be a routing/switching node comprising a routing/switching module 402 connected to a set of links 404 and 406 connecting the node to different nodes of the network. The node entity 400 comprises a number of modules which are configured to cooperate for performing the different operations of the method previously described.

The node entity 400 comprises: module 412 configured to perform active measurement of link characteristics, a request handling module 414, a measurement receiver module 416, measurement aggregation module 418, a sending module 420 and a data storage module 422 comprising a database.

The module 412 is configured to perform an active measurement process, e.g. BART, Iperf, PathChirp, for measuring link characteristics, e.g. round-trip time, latency, packet loss, packet delay, path available capacity, etc. The measurement process may be performed continuously, or performed on demand, e.g. triggered by the reception of a request message.

The request handling module 414 is configured to receive request messages requiring measurement results of a link characteristic related to a service, and to forward the received request messages to a node of the next lower level related to the service, if a lower level relatively the node exists. Thus, a request handling module 414 in a leaf node is adapted to not try to forward a received request message. The request handling module 414 is mainly configured to perform the operations according to blocks 110 and 120 of FIG. 3, as described above.

The measurement receiver module 416 is configured to receive aggregated measurement results of said link characteristics from one or more nodes belonging to the next lower level of the tree structure, if any such lower level exists relatively to the node. The measurement receiver module 416 is mainly configured to perform the operation according to block 130 of FIG. 3, as described above.

The measurement aggregation module 418 is configured to establish an aggregation message by aggregating own measurement result of said link characteristic achieved by the performed measurement process and received aggregated measurement results of said link characteristics. The module 418 is configured to retrieve the own measurement results from the measurement module 412. The measurement aggregation module 418 is mainly configured to perform the operation according to blocks 125 and 140 of the FIG. 3, as described above.

The sending module 420 is configured to send the established aggregation message to the node in the next upper level of the tree structure, or as specified in the request message. The sending module 420 is mainly configured to perform the operation according to block 150 of FIG. 3, as described above.

The data storage module 422 comprises a database wherein a copy of the sent aggregated measurement results is stored. The data storage module 422 is mainly configured to perform the operation according to block 160 of FIG. 3, as described earlier.

If the node entity 400 is situated in an initial node, root node of a tree structure, the node entity is configured to communicate with a requesting node entity of a requesting node, which may be e.g. an operator's network management node. The management node is not necessarily included in the tree structure. The initial node is therefore provided with a communication module 410 that is configured to receive request messages generated by a requesting node entity in a requesting node, and to send an aggregation message for each request message to the requesting node entity from which a request message was generated.

The node entity 400 is provided with controller module 408 comprising e.g. a digital processor for controlling the different modules 402 422 described above. Thus, the invention may be implemented in digital electronically circuitry, or in computer hardware, firmware, software, or in combinations of them. Modules and blocks of the exemplary embodiments of the present invention may be implemented in a computer program product tangibly embodied in a machine readable storage device for execution by a programmable processor; and method steps/blocks of the invention may be performed by a programmable processor executing a program of instructions to perform functions of the exemplary embodiments of the present invention by operating on input data and generating output.

The present invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially designed ASICs (Application Specific Integrated Circuits).

A number of embodiments of the present invention have been described. It will be understood that various modifications may be made without departing from the scope of the invention. Therefore, other implementations are within the scope of the following claims.

The invention claimed is:

1. A method for enabling active measurement for evaluating network performance in a network comprising a logical tree structure representing at least one service, said service provided through a set of links from an initial node in an upper level of the tree structure to a node in a lower level of said tree structure, each node of the tree structure comprising a measurement process configured to perform active measurement of link characteristics, wherein each of said nodes is configured to perform the method comprising:

Receiving a request message requiring measurement results of link characteristics related to a service;

Forwarding the received request message to at least one node of the next lower level related to the service, if any such lower level exists relative to the node;

Receiving an aggregation message comprising requested aggregated measurement results of the link characteristics from one or more nodes in the next lower level of the tree structure, if any such lower level exists relative to the node;

Establishing an aggregation message by aggregating own measurement result of the link characteristics achieved by the performed measurement process and, if any, received requested aggregated measurement results of the link characteristics;

Sending the established aggregation message to the node in the next upper level, or as specified in the request message; and Storing a copy of the sent aggregated measurement results in a database.

2. The method according to claim 1, wherein the establishing of an aggregation message is threshold triggered.

3. The method according to claim 1, wherein the receiving comprises, if the node is an initial node, receiving request messages generated by a requesting node; and sending the established aggregation message for each request message to the requesting node.

4. The method according to claim 3, wherein the requesting node is a network management node.

5. A node entity for enabling active measurement for evaluating network performance in a network comprising a logical tree structure representing at least one service, said service provided through a set of links from an initial node in an upper level of the tree structure to a node in a lower level of said tree structure, the node entity comprising a module configured to perform active measurement of link characteristics, the entity further comprising:

a module configured to handle request messages at the reception of a request message requiring measurement results of a link characteristic related to a service, and to forward the received request message to a node of the next lower level related to the service, if a lower level relative to the node exists;

a module configured to receive aggregated measurement results of said link characteristics from one or more nodes belonging to the next lower level of the tree structure, if any such lower level exists relative to the node;

a module configured to establish an aggregation message by aggregating own measurement result of said link characteristic achieved by the performed measurement process and, if any, received aggregated measurement results of said link characteristic;

a module configured to send the established aggregation message to the node in the next upper level, or as specified in the request message; and a database wherein a copy of the sent aggregated measurement results is stored.

6. The node entity according to claim 5, wherein the module is configured to perform the active measurement process of link characteristics when triggered by the reception of the request message.

7. The node entity according to claim 5, is an initial node of the logical tree structure related to the service, and the node entity comprises a module configured to receive request messages generated by a requesting node entity, and further configured to send established aggregation messages for each request message to the requesting node entity.

8. The node entity according to claim 7, wherein the requesting node entity is a network management node.

9. The node entity according to claim 5, the node entity comprises a routing and/or switching functionality module.

10. The node entity according to claim 5, wherein the measurement process is an active measurement process comprising at least one of BART, Ipert and PathChirp, for measuring link characteristics comprising at least one of round-trip time, latency, packet loss, packet delay, and path available capacity.

* * * * *

UNITED STATES PATENT AND TRADEMARK OFFICE
CERTIFICATE OF CORRECTION

| | | |
|---|---|---|
| PATENT NO. | : 9,077,633 B2 | Page 1 of 1 |
| APPLICATION NO. | : 13/807126 | |
| DATED | : July 7, 2015 | |
| INVENTOR(S) | : Meirosu et al. | |

It is certified that error appears in the above-identified patent and that said Letters Patent is hereby corrected as shown below:

Title page, Item (56), under "OTHER PUBLICATIONS", in Column 2, Line 5, delete "Photo & Stadier," and insert -- Prieto & Stadler, --, therefor.

Specification

In Column 9, Line 43, delete "modules 402 422" and insert -- modules 402-422 --, therefor.

Claims

In Column 11, Line 26, in Claim 10, delete "Ipert" and insert -- Iperf, --, therefor.

Signed and Sealed this
Twenty-fourth Day of November, 2015

Michelle K. Lee
*Director of the United States Patent and Trademark Office*